Aug. 30, 1949.    E. A. TUBBS    2,480,523

HIGH-FREQUENCY LEAKAGE SUPPRESSING CONNECTION

Filed Dec. 6, 1944

ERNEST A TUBBS
INVENTOR

BY
ATTORNEY

Patented Aug. 30, 1949

2,480,523

UNITED STATES PATENT OFFICE 2,480,523

HIGH-FREQUENCY LEAKAGE SUPPRESSING CONNECTION

Ernest A. Tubbs, Woodside, N. Y., assignor to Ferris Instrument Laboratories, Boonton, N. J., a corporation of New Jersey Application December 6, 1944, Serial No. 566,801

3 Claims. (Cl. 178—44)

My present invention broadly relates to electrical connections through electrically conductive housing components, and more particularly to such connections in the presence of high, very high and ultra high frequency electrical alternating currents and fields of such currents. As such, it is a continuation-in-part of an application for Letters Patent of the United States I filed on April 1, 1942, which was given and bears Serial No. 437,158, now abandoned.

A particular object of my present invention is to effectively equip electrical connections passing through sidewalls, partitions, ceilings, floors and the like of electrically conductive housings of the active elements of an electrical system dealing with high, very high and ultra high frequency electrical alternating currents with special means capable of intercepting and diverting to a very large extent from the electrical connections involved those components of the energies of the high, very high and ultra high frequency electrical alternating currents that would normally utilize such connections for escaping from the housing involved and subsequently spreading out into the surrounding space if not further housed or screened against such. For example, for many well understood technological reasons, it could be highly undesirable and extremely upsetting to have such components of ready-to-work energy escape to the surrounding space from the housing involved by way of connections to outside power sources needed to maintain the operations of the particular housed electrical system and thereby become potentially capable of creating effective upsetting interferences with outside operations depending upon another supply of energy from the particular housed system.

In this connection, and as a specific illustration of the trouble that the above outlined interferences can inject into the realm of outside operations, in the drawing of my Patent No. 2,293,227 of August 18, 1942, there are shown certain additions to the usual output system of a so-called "Standard Signal Generator" designed specifically to operate at any and all of the frequencies of electrical alternating currents in a very wide continuous range of from 5 to 175 megacycles to thus include operations at what may be termed high, very high and ultra high frequencies to distinguish the relative frequencies in the different parts of such a very wide range of them. As made clear in the said patent, these certain additions cause the respective readings of the indicated vacuum tube voltmeter to register more correctly how much useful alternating potential is respectively made available at the output end of the output system at any one time at any one of the operating frequencies covered, than was the case before the certain additions were made. However, I have found that if any component of energy purposely delivered to its end by the output system is supplemented by a component of corresponding energy escaping without being measured from the generator through the usual power leads for example, the consequential resulting interference seriously upsets the outcome of my special effort to obtain more accurate registering of the actual output end working voltages by the vacuum tube voltmeter installed about three feet from the output end. Accordingly, it is a further particular object of my present invention to render ineffective to a very large extent such a potentially pregnant source of interferences with standard signal generator work.

Since the particular means that I have found and rely upon to effect the desired relief from the above outlined lurking interferences must be installed in locations completely hidden from view and difficult of repair access within the otherwise complete housing involved, it is still another particular object of my present invention to make the particular means substantially immune against breakdowns that are otherwise most likely to occur for reasons that will be quite fully set forth later on herein.

The foregoing object, and possibly other objects, of my present invention, and how I effect them, should be readily understood from the following descriptive references to the respective figures of the accompanying drawing, which figures I briefly identify as follows.

Figure 1:
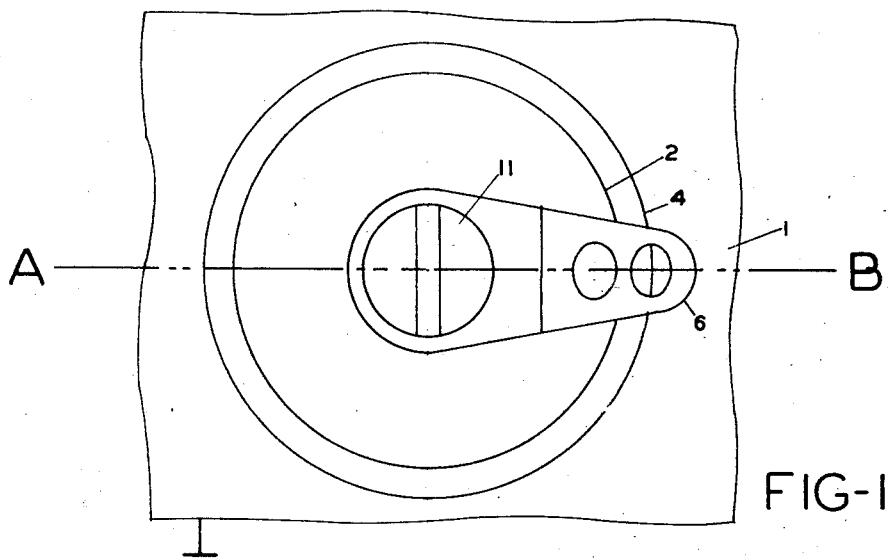
Fig. 1 is a top plan view of a generic embodiment of my present invention.
Figure 2:
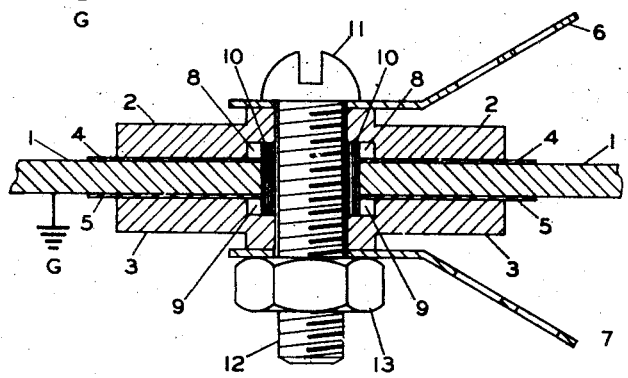
Fig. 2 is a cross-sectional view of Fig. 1 taken on its line AB, and in which like reference numerals to those in Fig. 1 refer to the same or equivalent parts.

Referring to Figs. 1 and 2, element 1 is intended to display a fragmentary only portion of a sidewall, partition, ceiling or floor, as the case may be, of an electrically conductive material housing for a collection of electrical elements assembled to generate or otherwise deal with generated electrical alternating currents of high, very high and ultra high frequencies, or any band containing such frequencies in whole or in part, which housing is most effectively grounded by such as the indicated ground connection G.

In general, such a housing of assembled electrical equipment requires a plurality of holes therein to accommodate the usual plurality of conductive connections to its outside, but for the purpose of describing my present invention in connection therewith a single hole adequately suffices. There is shown extending through the only shown hole through element 1 the threaded portion 12 of a bolt 11 provided with a nut 12, the diameter of which threaded portion is sufficiently less than the diameter of the hole to provide sufficient spacing therebetween to accommodate a centering and insulating bushing 10 extending beyond the hole on both sides to the extent indicated in Fig. 2.

Surrounding each of the two entrances to the hole in element 1 is a very thin washer, the indicated upper one being marked 4 and the indicated lower one being marked 5. Each of these washers is shown to be covered in part by a relatively thick washer marked 2 and 3 respectively. Shown leading to these relatively thick washers and to the threaded portion 12 of the bolt 11 are the connection elements 6 and 7, respectively, and it is obvious that by setting up the nut 13 tightly good electrical contacts between all of the elements involved are achieved and maintained.

Assuming that element 6 leads to a point in an assembly of electrical elements to which is fed the necessary electrical energy to maintain the assembly in operation as a generator of high, very high and ultra high frequency electrical alternating currents for example and that connecting element 7 leads to an outside source of the electrical energy necessary, we have through the threaded portion of bolt 11 an effective complete electrical connection therefor provided the materials of elements 6, 12 and 7 are electrically conductive to an effective degree. However, I have found that if nothing or little or nothing is done to prevent it, the components of the energies of different frequencies of the active electrical alternating currents that become associated with elements 6 and 11 and whatever connection there is thereto, exposed as they are to these activities, readily pass out of the housing and onto elements 7, 12 and 13 as well as onto all things connected thereto to radiate therefrom the residual energies of different frequencies to any present interceptors. Thus, if one of the present interceptors happens to be a radio receiver having its responsiveness to mere microvolt strength signals of a great many different frequencies checked by a Standard Signal Generator, the said interferences from this other channel would be sufficiently strong to be absolutely fatal to the success of the particular item of signal generator work.

If, however, the relatively thick washers 2 and 3 are made of a material highly conductive of electricity and much larger in effective area than the cross-sectional area of the threaded element 12, and the very thin washers are made of a highly resistant insulating material having a high dielectric constant, such as mica for an example of what I have used with outstanding success, there are introduced between the grounded element 1 and the leads 6 and 7, respectively, capacitances which are very substantial from the point of view of the high, very high and ultra high frequencies and which due to the relatively large areas and thicknesses of the washers 2 and 3, have very minor inductances associated therewith; as a natural consequence of which, compared to the relatively high impedance of the threaded screw 12, the high, very high and ultra high frequency effects find an inviting, comparatively very low impedance pair of paths to ground through these artificially introduced capacitances.

With so-called field strength and noise meters, seepage of interfering fields of electrical energy to the outside of signal generator and the like housings can be both detected and measured as to strengths if in sufficient amount to be disturbingly interfering, and it is by reason of the investigations I have made with these meters in the cases of many signal generators in particular that I know the extent to which my present invention has been outstandingly successful as a prevention against disturbing interferences of the kind involved.

Unfortunately, my first attempt to thus take advantage of the very high insulation resistance and high dielectric constant of mica gave rise to a very serious problem in the case of making elements 4 and 5 of Fig. 2 acceptably dependable in all respects for a satisfactorily long time under all of the various conditions of use of the various instrumentalities with and in which my present invention could be used to considerable advantage had to be effectively solved.

First of all, mica at its best is inherently flaky and brittle plus offering very little resistance to tearing, which shortcomings obviously become highly accentuated when specimens of it are reduced to the very thin form absolutely necessary to give the relatively high order of capacitance under the limited spacial conditions my present invention calls for. Of course, it is technologically obvious that any electrical upsets that can stem out of these mechanical faults inherent to mica are more likely to have as an origin or as origins some place or places in the terminating edges of the particular mica washers irrespective of whether or not the faulty place or places is or are in an inner or outer edge of the same. Consequently, after more mature consideration, I show in Fig. 2 in each of the electrically conductive washers 2 and 3 a central recess marked 8 and 9, respectively, because I had found that unless the inner and outer edges of the said mica washers extend with margin to spare beyond the same edges of the washers 2 and 3 in all cases the mica edges mechanically faulty in the above enumerated respects will sooner or later give evidence of having ceased to function properly as a dielectric in the way of outside disturbing electrical interferences that conclusively make evident that immediate repairing must be undertaken if the resulting interferences are to be effectively suppressed. In the case of the kind of complete housing bound to be involved, it is certainly apparent that as a consequence necessary repairing would be nothing short of a major, time consuming operation. These are the reasons why I clearly show in Fig. 2 substantial extensions of the edges of the washers 4 and 5 beyond the corresponding edges of the washers 2 and 3.

To further offset and insure against any possibility of having to engage in time consuming repairing, I may take the further precaution of coating the exposed outer rims and edges of the said mica washers and the outer edges of the said electrically conductive washers with a coating compound known to me to be an effective electrical insulator for the high, very high and ultra high frequency electrical alternating current activities in which I am particularly interested. By virtue of this further precaution, the junctions of the respective dielectric and conductive washers are most effectively sealed against moisture and conductive dust penetrating therebetween and thereby reducing the resulting high for the purpose capacitance. Also, choosing as I prefer to do a coating compound of a higher dielectric constant than had by air, that part of the said compound that seeps into the inherent crevices of the flaky mica and replaces air helps out by thus automatically increasing the effective capacitance sought. Because of being sealed up by the mode of assembly, the inner rims and edges of the said washers can do without such a coating.

Figure 3:
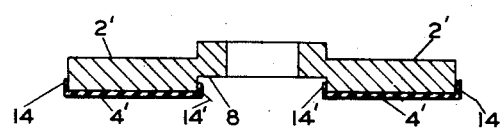
Fig. 3 illustrates, in a cross-sectional view taken on line AB of Fig. 1 of one of its elements, a manner in which the generic embodiment of my present invention may be modified without departing from the spirit of the same.

Referring to Fig. 3, it shows in element 2' a cross-sectional view of element 2 of Fig. 1 on its line AB, and that to this element is added an element 4' having around-the-corner extensions 14 and 14'. This element 4', and the extensions 14 and 14' if used, comprise a coating positioned on element 2' substantially as shown, and consists of an electrical insulating material preferably having a very high dielectric constant in order to effectively co-operate in giving a relatively high capacitance for the area involved. Because of the exceptional highness of the dielectric constants of titanate compounds, and of titanium dioxide in particular, plus the susceptibility of the same to forming as indicated a very thin but permanent coating on any electrically conductive material out of which a suitable-for-its-purpose element 2' may be made, where there are no controlling obstacles in the way a titanium dioxide coating for element 2' is considered to be far more preferable than any other known electrically insulating compound that is susceptible to being coated as a permanent fixture on any electrically conductive material.

From the above it is perfectly clear that if what is shown by Fig. 3 is substituted for the elements 2 and 4 or 3 and 5, or for even both, as a modification of the generic form of my present invention, the spirit of the same will still remain in all relevant respects. In fact, because of the simplifying to a considerable extent of the matter of assembly of instrumentalities having a real need for the part my present invention can play plus inherently being able to make my present invention function much more effectively due to the considerably greater capacitance that stems out of the much higher dielectric constant brought to bear, the modification clearly has outstanding earmarks of being a very substantial improvement over the generic form of the same.

Particular attention is invited to the fact that with respect to both forms of my present invention I show in the drawings and lay stress upon using relatively thick electrically conductive washers mounted on very thin high constant dielectrics, this because I have found that there are vitally important reasons therefor in adapting either form to the work of signal generators in particular that now most remarkably include in a single portable unit the ability to generate and put to use voltages of electrical alternating currents of all frequencies within the extremely wide range of 20 to 250 megacycles with margin to spare at each end as one outstanding example of such an extremely wide coverage now among those instrumentalities of the kind with which I am acquainted. I point out that in any such case or approach thereto, it is just as important to the work involved to have operations at the high frequencies of the 20 megacycle range as trustworthy as the operations at the ultra high frequencies of the 250 megacycle range.

With respect to the above considered operational aspects, I have found that a capacitance established between the electrically conductive washers and the grounded electrically conductive housing that is sufficiently large enough to make those components of the high frequency energies that escape to the region outside of the housing not strong enough to effectively interfere with and upset the 20 megacycle range of operations suffices to do the same more effectively as the frequencies of operation are increased into the very high and ultra high frequency ranges. Even though the value of capacitance necessary for this purpose could be arrived at with a relatively thick dielectric that would not be critically subject to breaking down provided the area covered is correspondingly increased by a greater expenditure of the materials involved, because I have found that more often than not the usual crowding in the assemblies involved does not consistently leave sufficient free spaces for the said increased area coverage makes it more or less compulsory to use the very thin, lesser area, dielectric components, is the principal reason why my present invention calls for very thin dielectric components coupled with taking effective precautions against breaking down.

For the above stated reasons, it seems to be perfectly clear that any established value of capacitance that satisfactorily meets what is required at the lowest of all of the frequencies of operations covered is certain to be increasingly more satisfactory as the frequencies of operations are increased.

While I have described my present invention in certain confined respects, it is apparent that modifications may be made and that no limitations are intended other than those imposed by the scope of the appended hereto claims.

What I claim as new and desire to secure by Letters Patent of the United States is as follows:

1. In an electrical connection through an electrically conductive housing component, means for effectively limiting the passage of any of the energies of electrical alternating currents of high, very high and ultra high frequencies by way of an electrical conductor insulatedly passing through a normal hole in a grounded housing made of effective electrically conductive material and otherwise completely housing an assembly of electrical elements capable of generating or handling generated electrical alternating currents having said frequencies: comprising an electrical conductor passing through a normal hole in said housing; an electrical insulating bushing within said hole for fixedly centering said electrical conductor therein markedly extending beyond the same; a very thin mica washer having an area many times the cross-sectional area of said hole centered around said bushing; a relatively thick compared to said mica washer electrically conductive washer having a diameter markedly less than the diameter of said mica washer conductively centered around said electrical conductor and having a circular recess in its central portion facing in the direction of said mica washer of markedly greater diameter than the diameter of the central hole of said mica washer whereby an inner ring of the latter is not in contact with said conductive washer; and means for pressing said mica washer against the covered thereby portion of the said grounded housing by the said electrically conductive washer.

2. The means of claim 1 in which substantially all of the exposed outer rim and edge of the said mica washer and the edge of the said electrically conductive washer are together coated with an electrical insulating compound effective for electrical alternating currents of high, very high and ultra high frequencies.

3. The housing and hole therein of claim 1 having the means of claim 1 on both sides of the said hole.

ERNEST A. TUBBS.

REFERENCES CITED

The following references are of record in the file of this patent:

UNITED STATES PATENTS

| Number | Name | Date |
|---|---|---|
| 1,309,799 | George | July 15, 1919 |
| 1,899,540 | Towne | Feb. 28, 1933 |
| 1,941,397 | Grier | Dec. 26, 1933 |
| 2,221,105 | Otto | Nov. 12, 1940 |
| 2,281,602 | Ruben | May 5, 1942 |

FOREIGN PATENTS

| Number | Country | Date |
|---|---|---|
| 588,358 | France | May 6, 1925 |
| 640,562 | Germany | Jan. 7, 1937 |
| 214,062 | Switzerland | July 1, 1941 |